United States Patent
Malone et al.

(10) Patent No.: US 7,305,259 B1
(45) Date of Patent: Dec. 4, 2007

(54) APPARATUS AND METHOD FOR REDUCING POWER CONSUMPTION IN WIRELESS RF SYSTEMS

(75) Inventors: Lawrence J. Malone, Carlsbad, CA (US); Aaron D. Lamb, San Diego, CA (US)

(73) Assignee: National Semiconductor Corporation, Santa Clara, CA (US)

( * ) Notice: Subject to any disclaimer, the term of this patent is extended or adjusted under 35 U.S.C. 154(b) by 621 days.

(21) Appl. No.: 09/938,209

(22) Filed: Aug. 23, 2001

(51) Int. Cl.
H04B 1/38 (2006.01)
(52) U.S. Cl. .................... 455/574; 455/343.1
(58) Field of Classification Search ............... 455/571, 455/572, 573, 574, 343.1, 343.2, 343.6
See application file for complete search history.

(56) References Cited

U.S. PATENT DOCUMENTS

| | | | |
|---|---|---|---|
| 5,940,742 A * | 8/1999 | Dent | 340/7.22 |
| 6,275,712 B1 * | 8/2001 | Gray et al. | 455/522 |
| 6,445,937 B1 * | 9/2002 | daSilva | 455/574 |
| 7,020,102 B2 * | 3/2006 | Tuomainen et al. | 370/311 |
| 2002/0016189 A1 * | 2/2002 | Sheynblat et al. | 455/574 |
| 2002/0052227 A1 * | 5/2002 | Yamatani | 455/572 |
| 2002/0106997 A1 * | 8/2002 | Barber et al. | 455/343 |

\* cited by examiner

*Primary Examiner*—Fan Tsang
*Assistant Examiner*—Olisa Anwah

(57) ABSTRACT

A radio frequency (RF) transceiver having improved low power operating modes. The RF transceiver comprises: 1) a radio frequency (RF) modem section comprising: a) receive path circuitry for receiving and down-converting an incoming RF signal to thereby produce an incoming baseband signal; and b) transmit path circuitry for receiving and up-converting an outgoing baseband signal to thereby produce an outgoing RF signal; 2) a baseband section comprising baseband circuitry for receiving and processing the incoming baseband signal and for generating the outgoing baseband signal; and 3) a power-saving apparatus for determining that the baseband section is idle and, in response to the determination, reducing a power supply voltage providing power to the baseband section.

26 Claims, 2 Drawing Sheets

APPARATUS AND METHOD FOR REDUCING POWER CONSUMPTION IN WIRELESS RF SYSTEMS

TECHNICAL FIELD OF THE INVENTION

The present invention is directed, in general, to radio frequency (RF) receivers and, more specifically, to an apparatus and related method for reducing power consumption in a portable wireless device.

BACKGROUND OF THE INVENTION

The field of wireless communications encompass a variety of products, including personal devices such as pagers, cellular phones, and PCS phones, and information systems, such as wireless LANs (local area networks) and smaller wireless office networks. These products are widely used due to their convenience and comparatively low cost.

To maximize usage of the available bandwidth, a number of multiple access technologies have been implemented to allow more than one subscriber to communicate simultaneously with each base transceiver station (BTS) in a wireless system. These multiple access technologies include time division multiple access (TDMA), frequency division multiple access (FDMA), and code division multiple access (CDMA). These technologies assign each system subscriber to a specific traffic channel that transmits and receives subscriber voice/data signals via a selected time slot, a selected frequency, a selected unique code, or a combination thereof.

FDMA systems include frequency-hopped communication systems, in which the frequency spectrum is broken into channels that are small sub-spectrums. A transmitter and receiver pair can establish a communication link over a channel while other transmitter-receiver (TX-RX) pairs can use other channels. The channels selected by the TX-RX pair are chosen pseudo-randomly, typically based on a common time reference and the address (i.e., telephone number) of the receiver. For subsequent messages, new channels may be selected.

Mobile stations, such as cellular telephones, PCS handset devices, portable computers, telemetry devices, and the like, frequently operate from an external power source connected to the mobile station, with an internal battery supply being available to provide a limited period of operation without the external power source. Mobile stations which provide more extended intervals of battery back-up operation offer increased value of service to users and competitive advantages for service providers.

A mobile station enters the idle state when the mobile station is turned ON, is synchronized with the system, and has no calls in progress. During the idle state, a mobile station actively listens to a paging channel for information which includes overhead messages, such as system parameter messages, as well as messages directly addressed to the mobile station from a base station. Unfortunately, a mobile station operating on battery when it is in the idle state continues to drain the battery, even though the user does not make any effective use of the device.

Therefore, there is a need in the art for improves wireless devices that consume less power. In particular, there is a need for portable wireless mobile stations that consume less battery power. More particularly, there is a need for portable wireless mobile stations that consume less battery power when operating in an idle mode.

SUMMARY OF THE INVENTION

The limitations inherent in the prior art described above are overcome by the present invention which provides a radio frequency (RF) transceiver having improved low power operating modes. According to an advantageous embodiment of the present invention, the RF transceiver comprises: 1) a radio frequency (RF) modem section comprising: a) receive path circuitry capable of receiving and down-converting an incoming RF signal to thereby produce an incoming baseband signal; and b) transmit path circuitry capable of receiving and up-converting an outgoing baseband signal to thereby produce an outgoing RF signal; 2) a baseband section comprising baseband circuitry capable of receiving and processing the incoming baseband signal and capable of generating the outgoing baseband signal; and 3) a power-saving apparatus capable of determining that the baseband section is idle and, in response to the determination, reducing a power supply voltage providing power to the baseband section.

According to one embodiment of the present invention, the power-saving apparatus is further capable of reducing a power supply voltage providing power to the receive path circuitry.

According to another embodiment of the present invention, the power-saving apparatus comprises a timer and a switch operable to switch the power supply voltage on and off to the receive path circuitry.

According to still another embodiment of the present invention, the power-saving apparatus is further capable of monitoring the incoming baseband signal during a time period when the power supply voltage is switched on to the receive path circuitry and determining if the incoming baseband signal is directed to the RF transceiver.

According to yet another embodiment of the present invention, the power-saving apparatus, in response to a determination that the incoming baseband signal is directed to the RF transceiver, increases the power supply voltage providing power to the baseband section.

According to a further embodiment of the present invention, the power-saving apparatus, in response to a determination that the incoming baseband signal is directed to the RF transceiver, increases the power supply voltage providing power to the receive path circuitry.

According to a still further embodiment of the present invention, the power-saving apparatus is further capable of reducing a power supply voltage providing power to the transmit path circuitry.

According to a yet further embodiment of the present invention, the power-saving apparatus, in response to a determination that the incoming baseband signal is directed to the RF transceiver, increases the power supply voltage providing power to the transmit path circuitry.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, reference is now made to the following descriptions taken in conjunction with the accompanying drawings, in which.

DETAILED DESCRIPTION OF THE INVENTION

Figure 1:
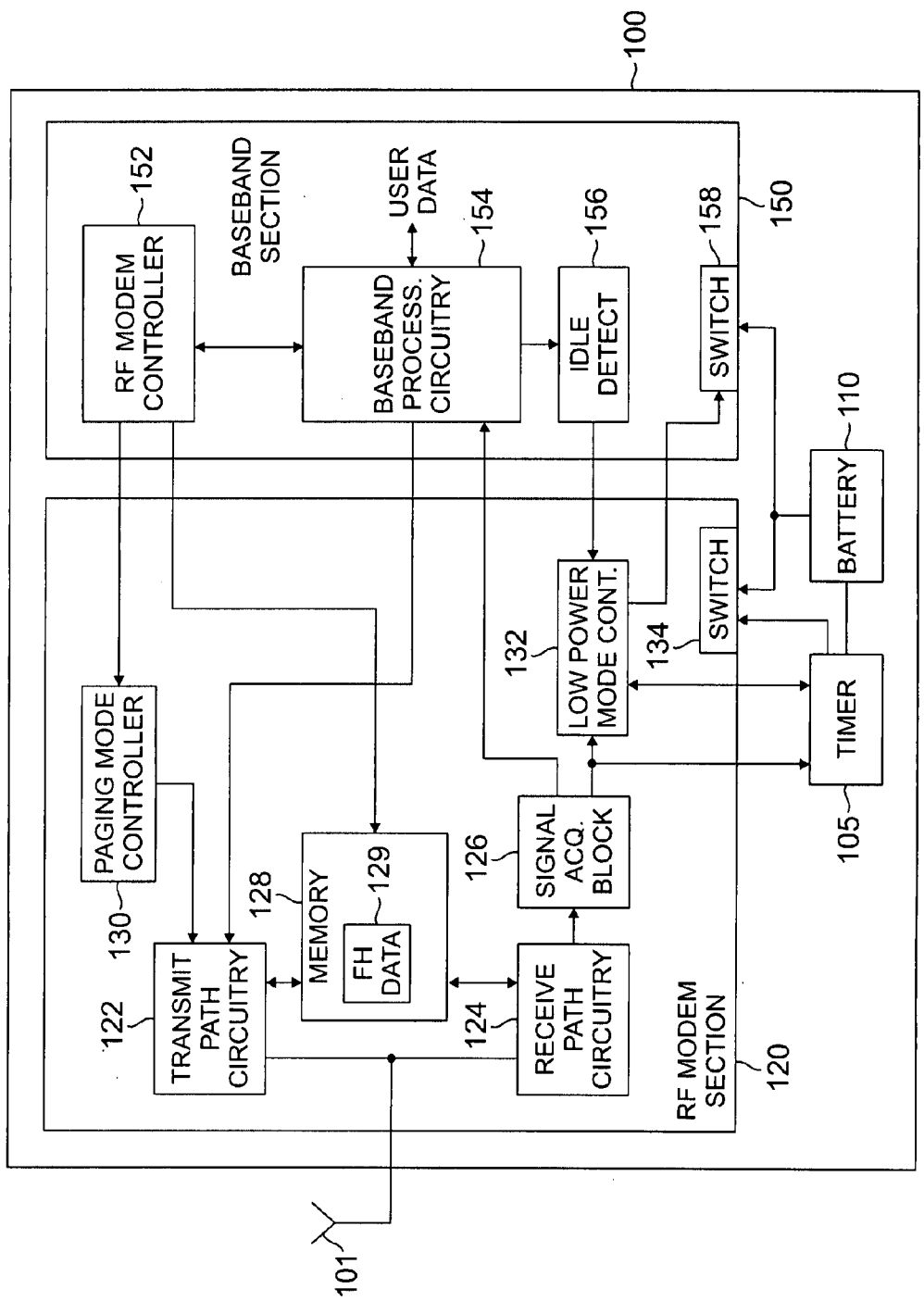
FIG. 1 is a block diagram illustrating a low power RF transceiver according to one embodiment of the present invention.
Figure 2:
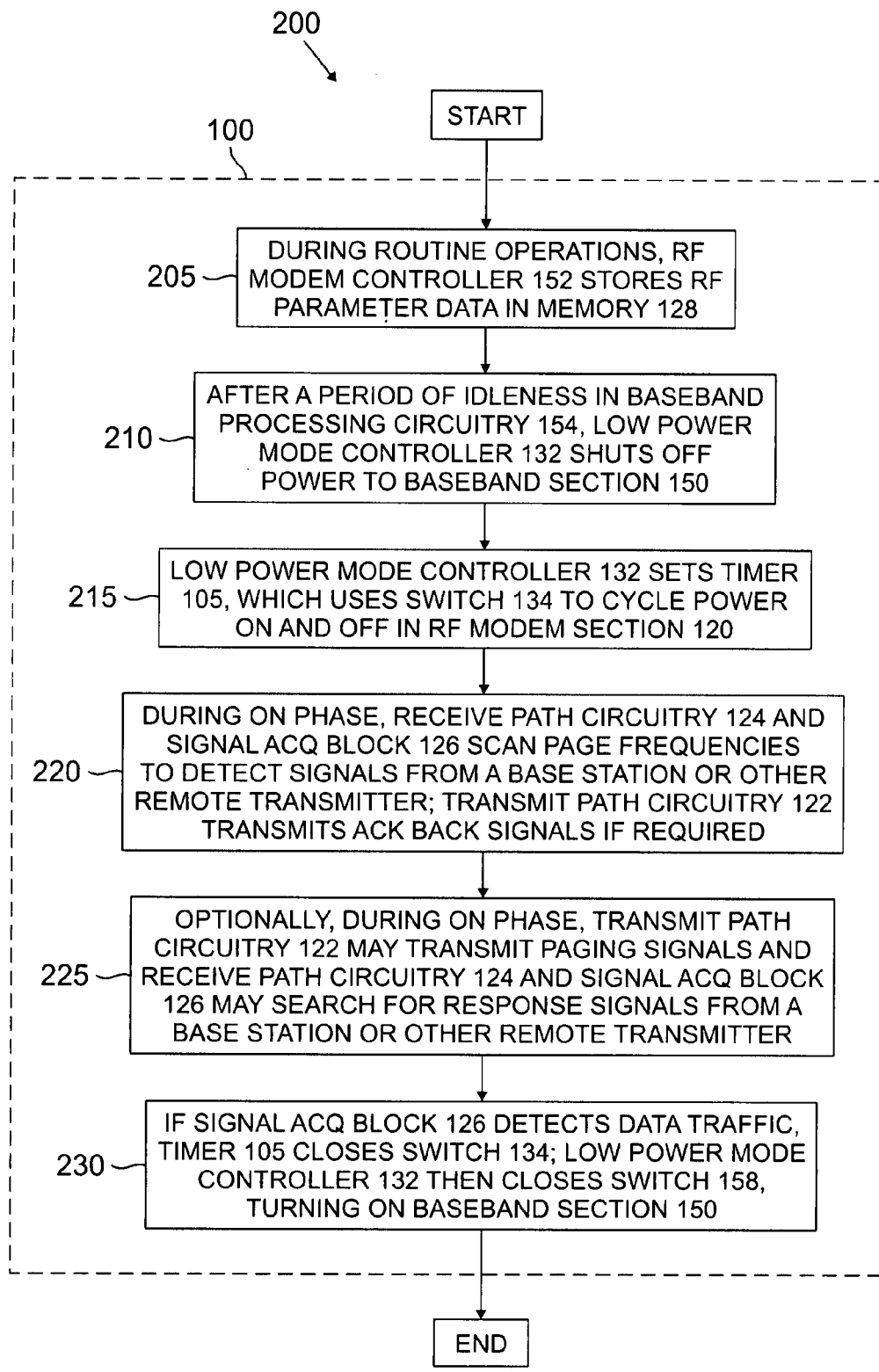
FIG. 2 is a flow diagram illustrating the low power mode operation of the RF transceiver in FIG. 1 according to an exemplary embodiment of the present invention.

FIGS. 1 and 2, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged frequency-hopped radio frequency (RF) transceiver.

FIG. 1 is a block diagram illustrating low power radio frequency (RF) transceiver 100 according to one embodiment of the present invention. RF transceiver 100 may be any type of wireless communication device in which it is important to minimize power consumption, particularly battery-operated portable devices. Thus, RF transceiver 100 may be a mobile (i.e., cellular) phone, a two-way pager, a personal communication services (PCS) device, a laptop personal computer (PC) equipped with a wireless modem, and the like.

RF transceiver 100 comprises antenna 101, timer 105, battery 110, radio frequency (RF) modem section 120, and baseband section 150. RF modem section 120 comprises transmit path circuitry 122, receive path circuitry 124, signal acquisition block 126, memory 128, paging mode controller 132, and power switch 134. Memory 128 may be, for example, a non-volatile memory, such as a low-power flash RAM that stores RF communication parameter data, such as frequency hopping (FH) data parameters 129, used by RF transceiver 100 to transmit data to receive data. Baseband section 150 comprises RF modem controller 152, baseband processing circuitry 154, idle detection circuit 156, and power switch 158.

During normal operation, power switch 134 and power switch 158 are closed (ON) and supply voltage power from battery 110 is applied to the components of RF modem section 120 and baseband section 150, thereby enabling RF transceiver 100 to send and receive data. However, as will be described below in greater detail, power switches 134 and 158 may be selectively opened (OFF) when RF transceiver 100 is not transmitting data to, or receiving data from, a remote base station or a wireless network. When power switches 134 and 158 are opened, the power supply voltage is cut off to the components of RF modem section 120 and baseband section 150, thereby greatly reducing power consumption in RF transceiver 100. When switches 134 and 158 are both open, only timer 105 continues to consume power.

Receive path circuitry 124 and signal acquisition block 126 in RF modem section 120 convert incoming RF signals from antenna 101 down to a baseband bit stream. Receive path circuitry 124 typically comprises signal amplifiers, down-conversion mixers, and demodulation circuitry. Signal acquisition block 126 receives the baseband bit stream and performs simile comparison operations to determine if the received data bits match a known pattern or address indicating that RF transceiver 100 is receiving a data transmission form an external transmitter. The receive path components are usually implemented with application specific integrated circuit (ASIC) chips, such as low noise amplifier (LNA) chips, filters, frequency discriminators, bit slices, and the like.

Once a signal is acquired by signal acquisition block 126, the baseband bit stream is transferred to baseband processing circuitry 154 for subsequent processing. Generally speaking, baseband section 150 implements higher level functions, such as grouping received baseband bits into user data packets, parsing user data packets into a baseband bit stream suitable for transmission, establishing network layer links across the wireless link to other devices, and the like. These functions are typically implemented using a microprocessor and RAM.

Transmit path circuitry 122 receives outgoing baseband bit streams from baseband processing circuitry and converts it to an outgoing RF signal that is transmitted via antenna 101 to, for example, a base station in a cellular network. Transmit path circuitry 122 typically comprises modulation and encoding circuitry, up-conversion mixers, and RF power amplifiers. If RF transceiver 100 is idle (i.e., not actively transmitting and receiving data) paging mode controller 130 may generate intermittent paging messages (i.e., beacon signals) that are transmitted by transmit path circuitry 122 in order to notify the external wireless network that RF transceiver 100 is still active in the network.

Baseband section 150 controls the operation of RF modem section 120 via RF modem controller 152. RF modem controller 152 provides selected RF operating parameters, signal parameters, ESN data, encoding or encryption data, and the like that enable transmit path circuitry 122 and receive path circuitry 124 to operate in a particular network according to a particular multiple access protocol, such as TDMA, FDMA, CDMA, or the like. For example, if RF transceiver 100 is a frequency-hopped system, RF modem controller 152 determines the sequence of hopping channels that the receiver components must search and stores the frequency-hopping (FH) parameters in memory 128. RF modem controller 152 also provides paging information to paging mode controller 130.

At times it is desired for the baseband processor to be powered down, or otherwise disassociated with the radio chip. During these times, the radio chip can listen for transmissions on its own, or enter a paging mode in which it alternately transmits and receives, waking up the baseband processor when it detects an incoming packet destined for it. These functions are performed by low power mode controller 132 and timer 105.

Idle detection circuit 156 monitors baseband processing circuitry 154 and determines when an idle condition exists, such as when baseband processing circuitry 154 is not transmitting or receiving user data traffic. Idle detection circuit 156 notifies low-power mode controller 132 of the idle condition and low power mode controller 132 may respond by entering one of three low-power modes. In a first low-power mode, low power modem controller 132 opens power switch 158, thereby turning off baseband section 150. At this point, RF modem section 120 contains sufficient digital logic functionality to interpret the frequency hopping parameters and autonomously search for the transmitter without interaction by baseband section 150. Likewise, during paging operations, paging mode controller 130 in RF modem section 120 can use the same parameters to hop to the predetermined frequencies while baseband section 150 is off.

In a second low-power mode, low power modem controller 132 again opens power switch 158, turning off baseband section 150, but also selectively turning off power to the transmission circuitry in RF modem section 120. In particular, RF modem section 120 may close embedded power switches (not shown) that cut off power to transmit path circuitry 122 and paging mode controller 130. This mode saves even more power, but still permits receive path circuitry 124 and signal acquisition block 126 to continually monitor for incoming RF signals directed to RF transceiver 100. If an incoming RF signal directed to RF transceiver 100 is detected, signal acquisition block 126 sends a notification signal to low power mode controller 132, which responds by reapplying power to the transmitter portion of RF modem section 120 and by closing power switch 158, thereby reapplying power to baseband section 150.

In a third low-power mode, low power modem controller 132 again opens power switch 158, turning off baseband section 150, but also selectively transmits a disable signal to timer 105, which responds by opening power switch 134, turning off power to all of RF modem section 120, including low power mode controller 132. However, data in non-volatile memory 128 is preserved. In this mode, only timer 105 receives power from battery 110. This mode saves the most power.

Thereafter, timer 105 cycles power switch 134 on and off according to predefined parameters established for RF transceiver 100. The on periods are sufficiently long so that receive path circuitry 124 and signal acquisition block 126 can detect an incoming RF signal directed to RF transceiver 100. If such an incoming signal is detected, signal acquisition block 126 sends a notification signal to timer 105, which stops cycling power and simply leaves power switch 134 closed. This reapplies power to the transmitter and receiver portions of RF modem section 120. Lower power mode controller 132 then closes power switch 158, which reapplies power to baseband section 150.

The power reduction in RF modem section 120 is determined by the duty cycle of timer 105. For example, if timer 105 closes power switch 134 for 0.25 seconds and opens power switch 134 for 0.75 seconds, once each second, then power consumption in RF modem section 120 is reduced 75% during idle periods.

FIG. 2 depicts flow diagram 200, which illustrates the low power mode operation of RF transceiver 100 according to an exemplary embodiment of the present invention. During routine operations, RF modem controller 152 stores RF parameter data in memory 128 (process step 205). After a period of idleness in baseband processing circuitry 154, low power mode controller 132 shuts off power to baseband section 150 (process step 210). Low power mode controller 132 then sets timer 105, which uses switch 134 to cycle power on and off in RF modem section 120 (process step 215).

During the ON phase, receive path circuitry 124 and signal acquisition block 126 scan paging frequencies to detect signals from a base station or other remote transmitter. Transmit path circuitry 122 transmits Acknowledgment Response (ACK Back) messages, if required (process step 220). Optionally, during the ON phase, transmit path circuitry 122 may transmit paging signals to remote network base stations, and receive path circuitry 124 and signal acquisition block 126 may search for response signals from a base station or other remote transmitters (process step 225). If signal acquisition block 126 detects data traffic, timer 105 closes switch 134. Low power mode controller 132 then closes switch 158, turning on baseband section 150 (process step 230).

Although the present invention has been described in detail, those skilled in the art should understand that they can make various changes, substitutions and alterations herein without departing from the spirit and scope of the invention in its broadest form.

What is claimed is:

1. A radio frequency (RF) transceiver comprising:
 a radio frequency (RF) modem section comprising:
  receive path circuitry capable of receiving and down-converting an incoming RF signal to thereby produce an incoming baseband signal; and
  transmit path circuitry capable of receiving and up-converting an outgoing baseband signal to thereby produce an outgoing RF signal;
 a baseband section comprising baseband circuitry capable of receiving and processing said incoming baseband signal and capable of generating said outgoing baseband signal; and
 a power-saving apparatus capable of determining that said baseband section is idle and, in response to said determination, placing the RF transceiver in a first of a plurality of low-power modes by reducing a power supply voltage providing power to said baseband section;
 wherein the power-saving apparatus comprises a timer, and wherein only the timer is capable of receiving power when the RF transceiver is in another of the low-power modes.

2. The RF transceiver as set forth in claim 1 wherein said power-saving apparatus is further capable of reducing a power supply voltage providing power to said receive path circuitry in a second of the low-power modes.

3. The RF transceiver as set forth in claim 2 wherein said power-saving apparatus further comprises a switch operable to switch said power supply voltage on and off to said receive path circuitry.

4. The RF transceiver as set forth in claim 3 wherein said power-saving apparatus is further capable of monitoring said incoming baseband signal during a time period when said power supply voltage is switched on to said receive path circuitry and determining if said incoming baseband signal is directed to said RF transceiver.

5. The RF transceiver as set forth in claim 4 wherein said power-saving apparatus, in response to a determination that said incoming baseband signal is directed to said RF transceiver, increases said power supply voltage providing power to said baseband section.

6. The RF transceiver as set forth in claim 4 wherein said power-saving apparatus, in response to a determination that said incoming baseband signal is directed to said RF transceiver, increases said power supply voltage providing power to said receive path circuitry.

7. The RF transceiver as set forth in claim 6 wherein said power-saving apparatus is further capable of reducing a power supply voltage providing power to said transmit path circuitry in a third of the low-power modes; and wherein only the timer is capable of receiving power when the RF transceiver is in the third low-power mode.

8. The RF transceiver as set forth in claim 7 wherein said power-saving apparatus, in response to a determination that said incoming baseband signal is directed to said RF transceiver, increases said power supply voltage providing power to said transmit path circuitry.

9. The RF transceiver as set forth in claim 1 wherein said power-saving apparatus is further capable of reducing a power supply voltage providing power to said transmit path circuitry in a second of the low-power modes.

10. The RF transceiver as set forth in claim 9 wherein said power-saving apparatus is further capable of monitoring said incoming baseband signal and determining if said incoming baseband signal is directed to said RF transceiver.

11. The RF transceiver as set forth in claim 10 wherein said power-saving apparatus, in response to a determination that said incoming baseband signal is directed to said RF transceiver, increases said power supply voltage providing power to said transmit path circuitry.

12. The RF transceiver as set forth in claim 11 wherein said power-saving apparatus, in response to said determination that said incoming baseband signal is directed to said RF transceiver, increases said power supply voltage providing power to said baseband section.

13. A method of reducing power consumption in a radio frequency transceiver comprising: 1) receive path circuitry for receiving and down-converting an incoming RF signal to produce an incoming baseband signal; 2) transmit path circuitry for receiving and up-converting an outgoing baseband signal to produce an outgoing RF signal; and 3) a baseband section comprising baseband circuitry for receiving and processing the incoming baseband signal and generating the outgoing baseband signal, the method comprising the steps of:
    determining that the baseband section is idle;
    in response to the determination that the baseband section is idle, placing the RF transceiver in a first of a plurality of low-power modes by reducing a power supply voltage providing power to the baseband section; and
    in another of the low power modes, supplying power only to a timer in the radio frequency transceiver, wherein the timer is capable of selectively increasing the power provided to at least the receive path circuitry.

14. The method as set as set forth in claim 13 further comprising the step of reducing a power supply voltage providing power to the receive path circuitry in a second of the low-power modes.

15. The method as set forth in claim 14 further comprising the step of switching the power supply voltage on and off to the receive path circuitry.

16. The method as set forth in claim 15 further comprising the steps of:
    monitoring the incoming baseband signal during a time period when the power supply voltage is switched on to the receive path circuitry; and
    determining if the incoming baseband signal is directed to the RF transceiver.

17. The method as set forth in claim 16 further comprising the step, in response to a determination that the incoming baseband signal is directed to the RF transceiver, of increasing the power supply voltage providing power to the baseband section.

18. The method as set forth in claim 16 further comprising the step, in response to a determination that the incoming baseband signal is directed to the RF transceiver, of increasing the power supply voltage providing power to the receive path circuitry.

19. The method as set forth in claim 18 further comprising the step of reducing a power supply voltage providing power to the transmit path circuitry in a third of the low-power modes; and
    wherein only the timer is capable of receiving power when the RF transceiver is in the third low-power mode.

20. The method as set forth in claim 19 further comprising the steps, in response to a determination that the incoming baseband signal is directed to the RF transceiver, of increasing the power supply voltage providing power to the transmit path circuitry.

21. The method as set forth in claim 13 further comprising the step of reducing a power supply voltage providing power to the transmit path circuitry in a second of the low-power modes.

22. The method as set forth in claim 21 further comprising the steps of monitoring the incoming baseband signal and determining if the incoming baseband signal is directed to the RF transceiver.

23. The method as set forth in claim 22 further comprising the step, in response to a determination that the incoming baseband signal is directed to the RF transceiver, of increasing the power supply voltage providing power to the transmit path circuitry.

24. The method as set forth in claim 23 further comprising the step, in response to the determination that the incoming baseband signal is directed to the RF transceiver, of increasing the power supply voltage providing power to the baseband section.

25. A radio frequency (RF) transceiver, comprising:
    receive path circuitry capable of receiving and down-converting an incoming RF signal to thereby produce an incoming baseband signal;
    transmit path circuitry capable of receiving and up-converting an outgoing baseband signal to thereby produce an outgoing RF signal;
    baseband circuitry capable of receiving and processing the incoming baseband signal and capable of generating the outgoing baseband signal; and
    a power-saving apparatus capable of:
        reducing power provided to the baseband circuitry in a first low-power mode;
        reducing power provided to the baseband circuitry and to one of the transmit path circuitry and the receive path circuitry in a second low-power mode;
        reducing power provided to the baseband circuitry, the transmit path circuitry, and the receive path circuitry in a third low-power mode; and
        wherein the power-saving apparatus comprises a timer, and wherein only the timer is capable of receiving power when the RF transceiver is in the third low-power mode.

26. The RF transceiver as set forth in claim 25, wherein the power-saving apparatus is further capable of periodically increasing the power provided to at least the receive path circuitry using the timer when in the third low-power mode.

* * * * *